United States Patent
Span et al.

(10) Patent No.: US 11,613,302 B2
(45) Date of Patent: Mar. 28, 2023

(54) STEERING SYSTEM FOR A MOTOR VEHICLE

(71) Applicant: ZF Automotive Germany GmbH, Alfdorf (DE)

(72) Inventors: Eduard Span, Cologne (DE); Yavuz Demir, Lünen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 130 days.

(21) Appl. No.: 17/151,940

(22) Filed: Jan. 19, 2021

(65) Prior Publication Data

US 2021/0221427 A1 Jul. 22, 2021

(30) Foreign Application Priority Data

Jan. 22, 2020 (DE) .......................... 102020101481.3

(51) Int. Cl.
*B62D 5/04* (2006.01)
(52) U.S. Cl.
CPC ......... *B62D 5/0457* (2013.01); *B62D 5/0421* (2013.01)
(58) Field of Classification Search
CPC .............................. B62D 5/0457; B62D 5/0421
See application file for complete search history.

(56) References Cited

U.S. PATENT DOCUMENTS

| | | | | |
|---|---|---|---|---|
| 7,144,346 B2 * | 12/2006 | Hermann | ............... | B62D 5/008 475/19 |
| 7,591,342 B2 * | 9/2009 | Ozsoylu | ............... | B62D 5/0421 180/444 |
| 8,862,325 B2 * | 10/2014 | Soos | ................... | B62D 15/0235 701/41 |
| 10,768,075 B2 * | 9/2020 | Yu | ........................ | B62D 5/0481 |
| 2019/0017587 A1 | 1/2019 | Djie et al. | | |
| 2020/0156702 A1 * | 5/2020 | Dodak | .................... | H02K 21/16 |
| 2021/0179166 A1 * | 6/2021 | Bergmann | ............. | B62D 5/006 |

FOREIGN PATENT DOCUMENTS

| | | | |
|---|---|---|---|
| CN | 10001765 A | 7/2019 | |
| DE | 102006001820 A1 | 7/2007 | |
| DE | 10160717 A1 | 6/2013 | |
| DE | 102020101481 A1 * | 7/2021 | ........... B62D 5/0421 |
| DE | 112019005763 T5 * | 8/2021 | ............. B60T 1/065 |
| DE | 202022100964 U1 * | 4/2022 | |
| JP | 2016060246 A * | 4/2016 | |
| JP | 2019104488 A * | 6/2019 | ........... B62D 5/0448 |
| KR | 20180043883 A | 5/2018 | |
| WO | WO-03053763 A1 * | 7/2003 | ............. B62D 5/008 |
| WO | WO-2020166525 A1 * | 8/2020 | |

OTHER PUBLICATIONS

German Search Report for corresponding German Application Serial No. 10 2020 101 481.3, dated Oct. 4, 2022, pp. 1-10.

* cited by examiner

*Primary Examiner* — Kevin Hurley
(74) *Attorney, Agent, or Firm* — Robert James Harwood (57) ABSTRACT

A steering system (10) for a motor vehicle, which steering system (10) is configured as a steer-by-wire steering system, comprises a rack (14), an electric drive (16) for the longitudinal displacement of the rack (14), and a rotatably mounted supporting element (20) which is spaced apart from the electric drive (16) along the longitudinal axis of the rack (14), and the rotatably mounted supporting element (20) being in toothed engagement with the rack (14).

14 Claims, 8 Drawing Sheets

STEERING SYSTEM FOR A MOTOR VEHICLE

RELATED APPLICATION

This application claims priority to German Patent Application No. 10 2020 101 481.3 filed Jan. 22, 2020, the disclosure of which is incorporated herein by reference in its entirety.

BACKGROUND OF THE INVENTION

The invention relates to a steering system for a motor vehicle, which steering system is configured as a steer-by-wire steering system.

Steering systems usually comprise a rack which is mounted in a linearly displaceable manner for the adaptation of a wheel position. A rack of this type is originally coupled via a steering rod to the steering wheel, with the result that a linear displacement of the rack is achieved via a rotation of the steering wheel.

In the case of modern motor vehicles, what is known as a steer-by-wire steering system (SbW steering system) can be used, in the case of which there is no longer a mechanical connection between the steering wheel and the rack. The displacement of the rack is achieved by means of an electric drive. Torsional forces can occur here which act on the rack and cause an undesired rotation of the rack.

The mounting and the guidance of the rack are different in the case of a steer-by-wire steering system in comparison with conventional steering systems on account of the mechanical connection which is no longer present between the steering wheel and the rack.

In particular, the requirements made of the guidance of the rack change, since, as a result of the electric drive in the case of a steer-by-wire steering system, high shear forces can occur, for example higher than 13 kN, which shear forces have to be taken into consideration in the case of the guidance of the rack.

In addition, a torque is transmitted to the rack by way of the electric drive. Torsional forces can occur here which act on the rack and cause an undesired rotation of the rack. In addition, the rack is to be guided fundamentally with as little friction as possible, with the result that the rack can slide correspondingly smoothly through the steering system in the case of steering of the motor vehicle.

SUMMARY OF THE INVENTION

It is therefore an object of the invention to provide a robust, low-friction and inexpensive steering system, by way of which a rack can be guided, in particular in a steer-by-wire steering system.

According to the invention, said object is achieved by way of a steering system for a motor vehicle, which steering system is configured as a steer-by-wire steering system. The steering system comprises a rack, an electric drive for the longitudinal displacement of the rack, and a rotatably mounted supporting element which is spaced apart from the electric drive along the longitudinal axis of the rack. The rotatably mounted supporting element is in toothed engagement with the rack.

A longitudinal displacement of the rack is not locked or blocked by way of the supporting element by the rotatably mounted supporting element being in toothed engagement with the rack. Rather, the rack moves relative to the supporting element in a translational way, as a result of which the supporting element is rotated correspondingly. The rack can therefore serve for the transmission of a shear force. At the same time, the supporting element blocks a rotation of the rack and can therefore counteract a torque which acts on the rack. In this way, the rack is mounted on the steering system in a particularly stable manner.

In addition, a deflection of the rack can be avoided by virtue of the fact that the supporting element is spaced apart from the electric drive.

The supporting element is, for example, a pinion which rotates in the case of a longitudinal displacement of the rack.

The supporting element can be inclined relative to an axis which is perpendicular with respect to the displacement direction of the rack. The angle of inclination is an acute angle, in particular less than 45°, for example between 5° and 20°. In this way, a length, along which the rack is supported by way of the supporting element, is greater than in the case of a perpendicular orientation of the supporting element relative to the rack. This makes particularly satisfactory support of the rack possible.

As an alternative, the supporting element can be arranged perpendicularly relative to the displacement direction of the rack. This arrangement is more advantageous with regard to the required installation space than an inclined arrangement.

In particular, a sensor is provided which, together with an evaluation unit, is configured to determine the position of the rack. Therefore, a current wheel angle can be determined by means of the sensor, and can be compared with a steering request of the driver. In addition, monitoring can be carried out by means of the sensor as to when a position of the rack which corresponds to a steering request is reached and the electric drive can be switched off. In this respect, the sensor can be configured as part of a control loop and/or can act as part of a closed loop control system.

The sensor is, for example, an angle sensor or rotary encoder. The angle sensor or rotary encoder can be configured to measure an angular position of the supporting element, via which the (relative) position of the rack can be extrapolated. Accordingly, the angular sensor or rotary encoder can be configured to measure a performed relative rotation and/or the number of revolutions of the supporting element. In particular, a linear position of the rack can be determined by means of the angle sensor or the rotary encoder.

The sensor is, in particular, configured in multiple pieces, and comprises a sensor wheel and a pickup which can detect the position of the sensor wheel, in particular the angular position of the sensor wheel.

The sensor can be connected fixedly to the supporting element, the sensor being attached via the supporting element to the rack. More precisely, the sensor wheel is preferably connected fixedly to the supporting element. A compact overall design is achieved in this way. In addition, the mounting of the sensor is particularly simple. The sensor can be premounted on the supporting element, with the result that only the supporting element has to be installed in the case of final assembly. The supporting element forms, in particular, a mechanical connection between the rack and the angle sensor.

In accordance with one embodiment, the sensor is connected in a signal-transmitting manner to a control unit which actuates the electric drive. The electric drive can therefore be actuated electronically in a manner which is dependent on a detected angular position or a detected rotation of the supporting element.

In particular, the control unit is part of a closed loop control unit which obtains the detected angular position or rotation of the supporting element (actual value) as input variable.

The electric drive comprises, for example, a belt drive. Sufficiently high forces for the displacement of the rack can be transmitted to the rack by means of a belt drive, in particular forces in the range between 10 kN and 15 kN. In addition, a belt drive can be coupled to the rack in a simple way.

In accordance with one embodiment, a recirculating ball mechanism is provided which interacts with the electric drive, the recirculating ball mechanism being connected to the belt drive, in particular. The use of a recirculating ball mechanism has the advantage that less friction is produced by way of the rolling movement than in the case of conventional helical gear mechanisms with surfaces which slide on one another, with the result that the drive power can be reduced in the case of a recirculating ball mechanism. In addition, the movement speed is increased and the wear is reduced. Furthermore, the breakaway torque at the beginning of a displacement is reduced, that is to say what is known as the slip-stick effect does not occur or occurs merely to a very small extent.

The electric drive can be mounted in a manner which is spaced apart from the rack, by the recirculating ball mechanism being connected to a belt drive.

The steering system can comprise a bearing bush of separate configuration which supports the rack on the circumferential side. More precisely, the bearing bush can guide the rack and can transmit supporting forces to a housing, in particular to the housing of the recirculating ball mechanism. In addition, the rack is supported in an improved manner against flexural stress by way of the use of the bearing bush.

The steering system preferably comprises two bearing bushes which are spaced apart from one another in the longitudinal direction of the rack, the bearing bushes together forming a rack guide. For example, one of the bearing bushes is arranged in the region of the recirculating ball mechanism, in particular adjacently with respect to the recirculating ball mechanism, and the further bearing bush is arranged in the region of the supporting element. The bearing bushes ensure a reliable engagement between the rack and supporting element. In addition, the bearing bushes make particularly low-friction mounting of the rack possible. Further bearing bushes can optionally also be provided.

Furthermore, the steering system can comprise a pressure piece which is arranged in the region of the supporting element and which supports the rack. More precisely, the pressure piece presses the rack against the supporting element, in order to ensure that the supporting element remains in toothed engagement with the rack, even in the case of deflection of the rack. For this purpose, the pressure piece is loaded, for example, with a spring force. The pressure piece can therefore replace one of the two abovementioned bearing bushes, in particular the bearing bush in the region of the supporting element.

The pressure piece can be manufactured from a sliding material, for example from a plastic, in order to make sliding of the rack on the pressure piece in the longitudinal direction of the rack possible.

The rotatably mounted supporting element is assigned, for example, to a first end of the rack, the electric drive being assigned to a second end of the rack, which second end lies opposite the first end. In particular, the recirculating ball mechanism and/or the bearing bush are/is assigned to the second end. The pressure piece and/or the sensor are/is assigned, in particular, to the first end. As a consequence, the rack is mounted on both sides close to its two ends, as a result of which the rack is guided and mounted in a particularly stable manner.

BRIEF DESCRIPTION OF THE DRAWINGS

Further advantages and features of the invention result from the following description and from the appended drawings, to which reference is made and in which.

DESCRIPTION

Figure 1:
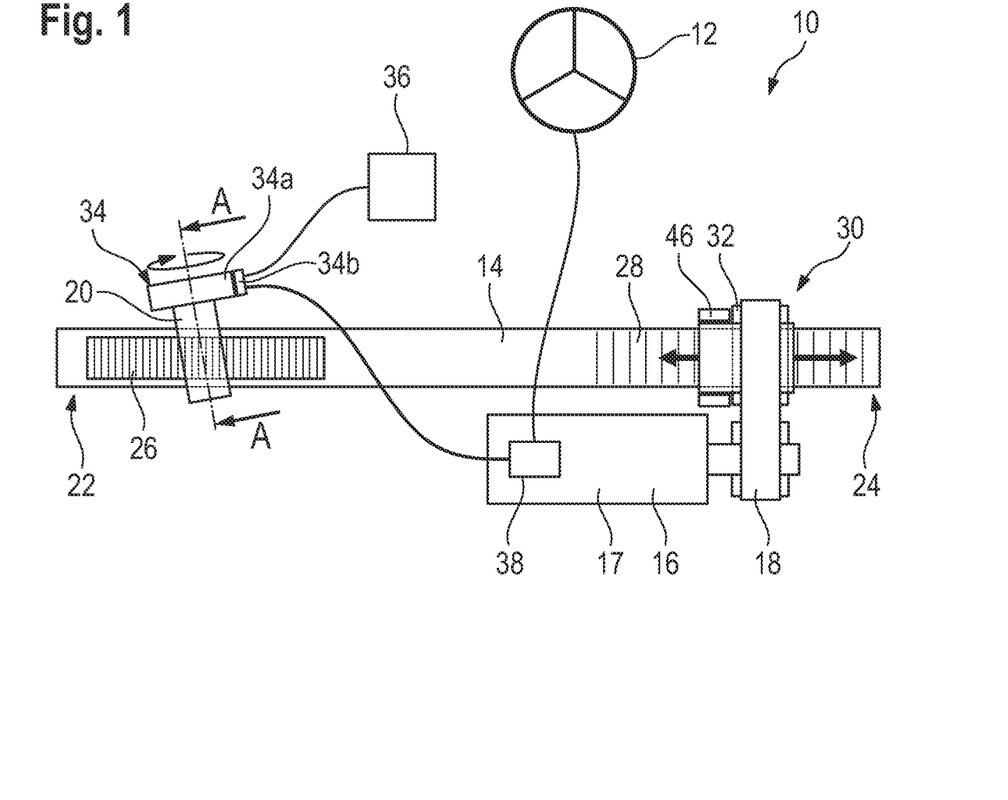
FIG. 1 diagrammatically shows a steering system according to the invention in accordance with a first embodiment.

FIG. 1 diagrammatically shows a steering system 10 according to the invention in accordance with a first embodiment. The steering system 10 is what is known as a steer-by-wire steering system, in the case of which there is no mechanical connection between a steering wheel 12 which can be actuated by a driver and the wheels of a motor vehicle for the transmission of the steering movement.

The steering system 10 comprises a rack 14 and an electric drive 16. The electric drive 16 serves for the longitudinal displacement (translational displacement) of the rack 14, in order to set a position of the wheels of a motor vehicle in a manner which corresponds to a steering request of the driver. In the exemplary embodiment which is shown, the electric drive 16 comprises an electric motor 17 and a belt drive 18.

There is merely an electronic connection here between the steering wheel 12 and the rack 14.

Furthermore, the steering system 10 comprises a rotatably mounted supporting element 20, in particular a pinion, which is in toothed engagement with the rack 14. Here, the supporting element 20 is spaced apart from the electric drive 16.

The supporting element 20 has a relatively great overlap with the rack 14, and can thus reliably support the torques which occur.

In particular, the rotatably mounted supporting element 20 is assigned to a first end 22 of the rack 14, whereas the electric drive 16 is assigned to a second end 24 of the rack 14, which second end 24 lies opposite the first end 22. The rack 14 is therefore mounted in a stable manner in the region of its ends 22, 24.

As can be seen in FIG. 1, a longitudinal axis of the supporting element 20 is inclined with respect to an axis which is perpendicular with respect to the displacement direction of the rack 14.

A toothing system 26 of the rack 14, with which the supporting element 20 is in contact, begins in the region of the first end 22 and extends from there toward the center of the rack 14. That is to say, the toothing system 26 does not extend over the entire length of the rack 14, but rather only over a part section of the rack 14. The length of the part section corresponds, for example, to a maximum translational movement range of the rack 14 in the displacement direction.

Starting from the second end 24, a thread 28 extends toward the center of the rack 14. The length of the thread 28 in the longitudinal direction of the rack 14 corresponds, for example, to the length of the toothing system 26 in the longitudinal direction of the rack 14.

Furthermore, a recirculating ball mechanism 30 is provided which interacts with the electric drive 16.

The recirculating ball mechanism 30 is a helical mechanism, in the case of which balls which cannot be seen in FIG. 1 transmit the force between a helix (in the present case, that section of the rack 14 which is provided with the thread 28) and a nut 32.

Both the thread 28 and the nut 32 in each case have a helical groove with a semicircular cross section, which grooves together form a helical tube which is filled with balls.

A longitudinal displacement of the rack 14 is brought about in the case of a rotational movement between the rack 14 and the nut 32. That is to say, the rack 14 is displaced when the nut 32 rotates.

In order to make a displacement of the rack 14 possible, in particular a rotation of the nut 32, the recirculating ball mechanism 30 is connected to the belt drive 18.

In order to detect a position of the rack 14, a sensor 34 is provided, in particular an angle sensor or a rotary encoder. More precisely, the sensor 34 is configured to measure an angular position of the supporting element 20. This means that the sensor 34 can measure performed relative rotation and/or the number of revolutions of the supporting element 20.

The sensor 34 is coupled to the supporting element 20, in particular is fastened to the latter. This means that the sensor 34 is attached via the supporting element 20 to the rack 14.

Sensors 34 of this type for the detection of an angular position of the supporting element 20 are as a rule configured in multiple pieces, and comprise a sensor wheel 34*a* which, in the case of a rotation of the supporting element 20, likewise rotates, and a pickup 34*b* which can detect a rotational position of the sensor wheel 34*a*.

Here, the sensor wheel 34*a* is fastened to the supporting element 20. The pickup 34*b* is preferably fixed firmly in the steering system 10, in particular on a housing of the steering system 10.

In addition, an evaluation unit 36 is provided for the determination of a (relative) position of the rack 14, the sensor 34 being configured together with the evaluation unit 36 to determine the position of the rack 14 indirectly via the angular position of the supporting element 20.

Furthermore, the steering system 10 comprises a control unit 38 which actuates the electric drive 16. The sensor 34 is connected in a signal-transmitting manner to said control unit 38. That is to say, the electric drive 16 can be actuated in a manner which is dependent on an angular position of the supporting element 20 or on a position of the rack 14.

Moreover, the control unit 38 is set up to detect a position of the steering wheel 12 and to compare said position with the position of the rack 14. Based on said comparison, the control unit 38 can activate the electric drive 16 or not.

Figure 2:
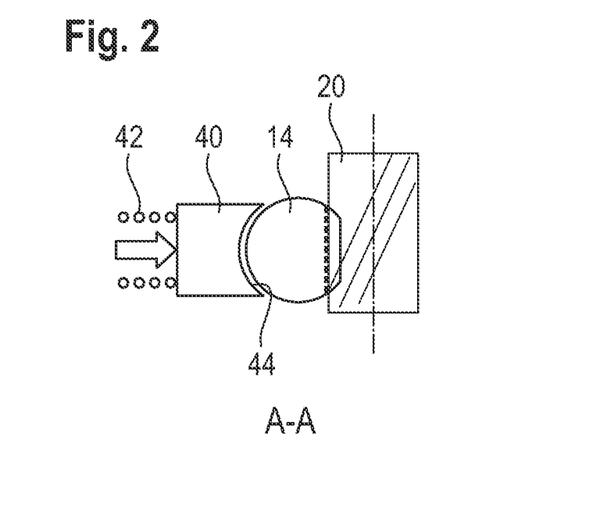
FIG. 2 shows a section through the steering system along the line A-A in FIG. 1.

FIG. 2 shows a section through the steering system 10 along the line A-A in FIG. 1, in particular in the region of the supporting element 20.

A pressure piece 40 can be seen in said sectional illustration, which pressure piece 40 is concealed by the rack 14 in the view which is shown in FIG. 1. The pressure piece 40 is arranged in the region of the supporting element 20 and serves, inter alia, to support the rack 14. It is ensured in this way that the toothed engagement between the supporting element 20 and the rack 14 is maintained even in the case of a deflection of the rack 14. In particular, the pressure piece 40 ensures an effective suppression of noise.

In order to ensure a particularly stable engagement, the steering system 10 can comprise a spring element 42, the pressure piece 40 being loaded with a spring force by way of the spring element 42, as is illustrated in FIG. 2 by way of an arrow.

A contact face 44 of the pressure piece 40 with the rack 14 is preferably adapted to the geometry of the rack 14, in particular is of concave configuration.

Moreover, the steering system 10 comprises a bearing bush 46 of separate configuration. The latter supports the rack 14 on the circumferential side. Furthermore, the bearing bush 46 ensures improved guidance of the rack 14. (Very) low-friction guidance of the rack 14 is possible by way of the bearing bush 46, in particular in comparison with the pressure piece 40.

In the embodiment which is shown in FIG. 1, the bearing bush 46 is provided in the region of the second end 24.

In one preferred embodiment (not shown), a bearing bush which is, in particular, of similar design is (also) provided at the first end 22, in order to ensure guidance of the rack 14 via this, in particular in the region of the first end 22. Said bearing bush can solely ensure the guidance of the rack 14 in the region of the first end 22. As an alternative, in addition to the pressure piece 40, said bearing bush can ensure the guidance of the rack 14, in particular in the region of the first end 22.

In the following text, the same designations are used for identical structures with identical functions which are known from the above embodiment, and reference is made in this respect to the preceding explanations, the differences of the respective embodiments being described in greater detail in the following text, in order to avoid repetitions.

Figure 3:
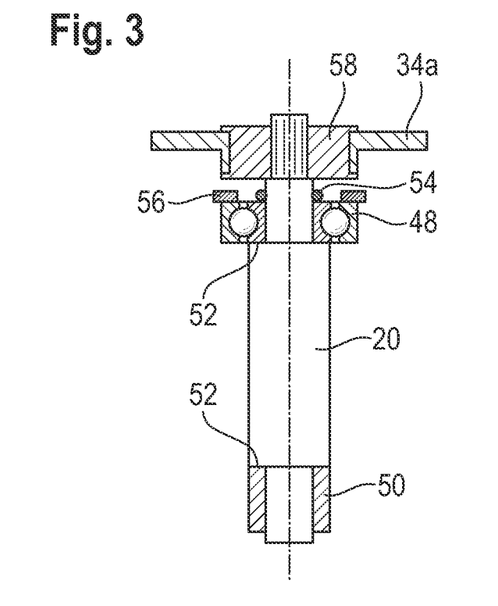
FIG. 3 shows the supporting element and a bearing system of the supporting element.

FIG. 3 shows a bearing system of the supporting element 20, it being provided that the supporting element 20 can be mounted in a housing such that it can be moved, in particular rotated.

In accordance with the embodiment according to FIG. 3, two bearings 48, 50 which are spaced apart from one another in the longitudinal direction of the supporting element 20 are provided.

For example, the first bearing 48 is a ball bearing, whereas the further bearing 50 is a needle bearing.

In relation to a state of the supporting element 20, in which it is mounted on the steering system 10, the first bearing 48 is arranged above the second bearing 50.

The two bearings 48, 50 in each case bear against a step 52 which is configured on the supporting element 20 and can also be called a shoulder section. This ensures that the two bearings 48, 50 are in each case arranged in a defined position.

Here, the first bearing 48 projects beyond the supporting element 20 in the radial direction, whereas the second bearing 50 terminates flush with the supporting element 20 in the radial direction.

The first bearing 48 is held on the supporting element 20 by way of a securing ring 54.

A further securing ring 56 is provided, in order to fasten the supporting element 20 in a housing (not shown in FIG. 3).

The sensor 34, or more precisely the sensor wheel 34a of the sensor 34, is connected in the exemplary embodiment which is shown via a slotted spacer sleeve 58 to the supporting element 20, in particular is connected in a positively locking manner.

The assembly which is shown in FIG. 3 forms one unit which can be preassembled, and can be inserted as a preassembled unit into a housing of a steering system 10.

Figure 4:
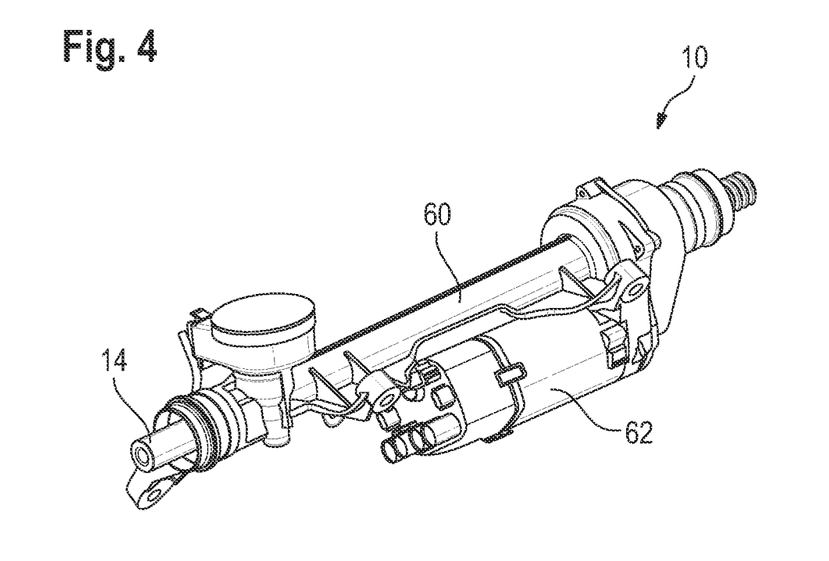
FIG. 4 shows a steering system in accordance with a further embodiment according to the invention.

FIG. 4 shows a steering system 10 in accordance with a further embodiment in a perspective view.

FIG. 4 shows a housing 60 of the steering system 10, and a housing 62 for the electric drive 16. The housing 62 is connected to the housing 60, for example by means of screws.

The two housings 60, 62 can be configured in each case in one piece or in multiple pieces. For example, the housings 60, 62 are manufactured in each case from aluminum.

Figure 5:
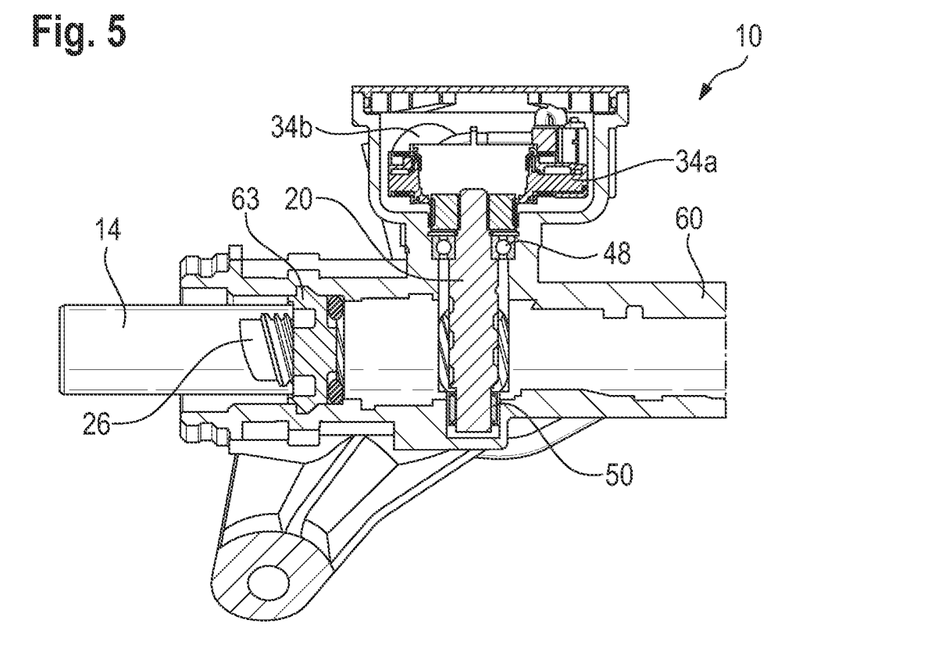
FIG. 5 shows a longitudinal section through the steering system from FIG. 4 in the region of the supporting element.

FIG. 5 shows a section through the steering system 10 from FIG. 4 in the region of the supporting element 20.

Said sectional illustration illustrates the bearing system of the supporting element 20 by means of the two bearings 48, 50. Here, the two bearings 48, 50 are provided on different sides in relation to the rack 14.

In particular, FIG. 5 shows the arrangement of a preassembled unit in the housing 60 of the steering system 10, as illustrated in FIG. 3. Here, the bearings 48, 50 are supported on the housing 60.

In addition, the steering system 10 comprises a damping unit 63 which can damp a stop of the rack 14 in an axial end position.

In the case of the embodiment which is shown in FIG. 5, in contrast to the embodiment which is illustrated in FIG. 1, the supporting element 20 is not inclined with respect to the longitudinal axis of the rack 14, but rather is arranged perpendicularly with respect to the longitudinal axis of the rack 14.

Figure 6:
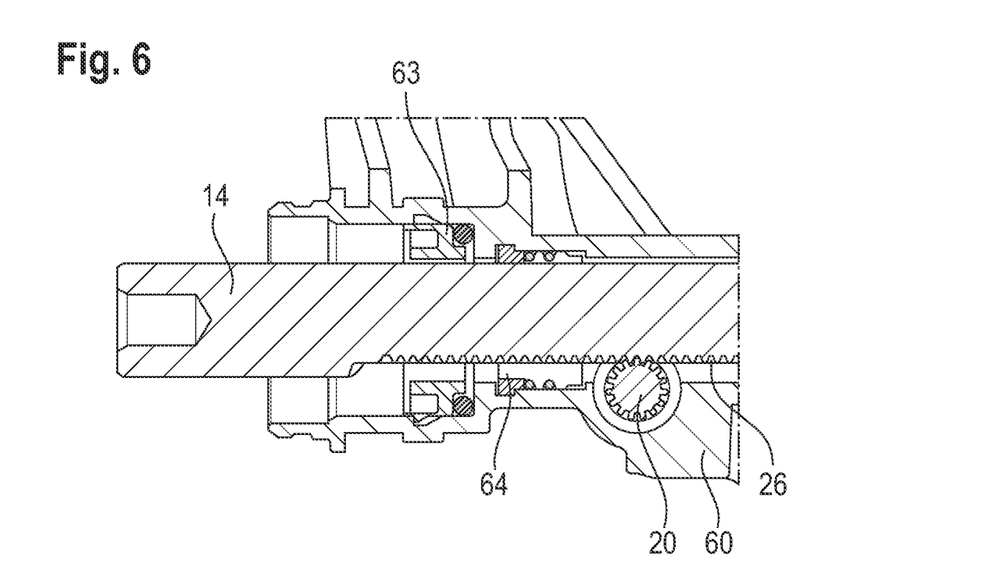
FIG. 6 shows a further section through the steering system from FIG. 4 in the region of the supporting element.

FIG. 6 shows a further section through the steering system 10 according to FIG. 4 in the region of the supporting element 20, in particular rotated by 90° with respect to the sectional illustration according to FIG. 5. The engagement of the supporting element 20 into the toothing system 26 of the rack 14 can be seen in the sectional view according to FIG. 6.

In addition, it can be seen from FIG. 6 that a further bearing bush 64 is provided in addition to the bearing bush 46 which is illustrated in FIG. 1, and likewise guides the rack 14.

The bearing bush 64 is arranged close to the supporting element 20, and therefore likewise for a reliable engagement between the rack 14 and the supporting element 20. In comparison with a pressure piece 20, the bearing bush 64 ensures particularly low-friction guidance of the rack 14. In particular, the bearing bush 64 ensures improved flexural stiffness of the rack 14 in the mounted state.

Figure 7:
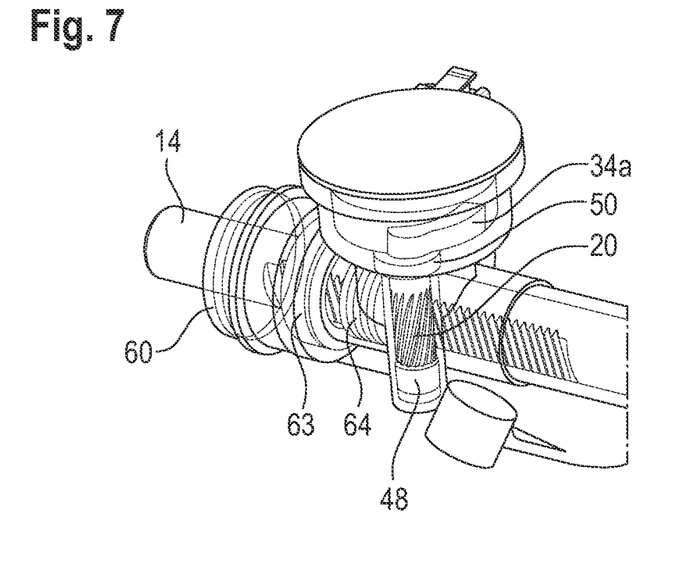
FIG. 7 shows a partially transparent perspective view of the steering system in the region of the supporting element.
Figure 8:
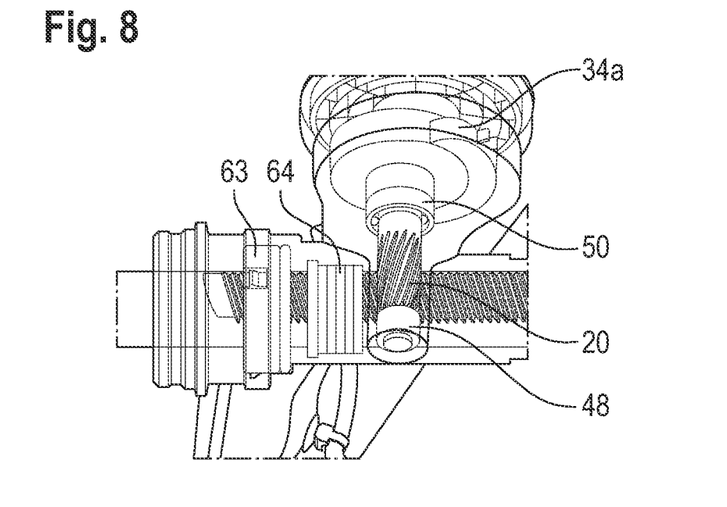
FIG. 8 shows a further partially transparent perspective view of the steering system in the region of the supporting element.
Figure 9:
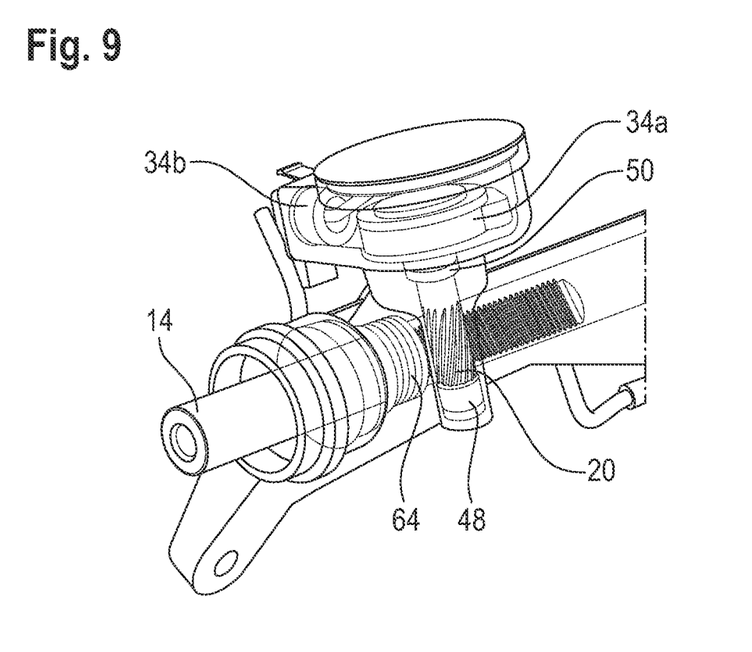
FIG. 9 shows a partially transparent perspective view of the steering system in the region of the supporting element.

FIGS. 7 to 9 in each case show a perspective view of the steering system 10 according to FIG. 4 in the region of the supporting element 20. For improved clarity, the housing 60 is shown in a partially transparent manner in FIGS. 7 to 9. FIGS. 7 to 9 illustrate, in particular, the engagement of the supporting element 20 with the rack 14, and the support of the rack 14 by way of the bearing bush 64.

Figure 10:
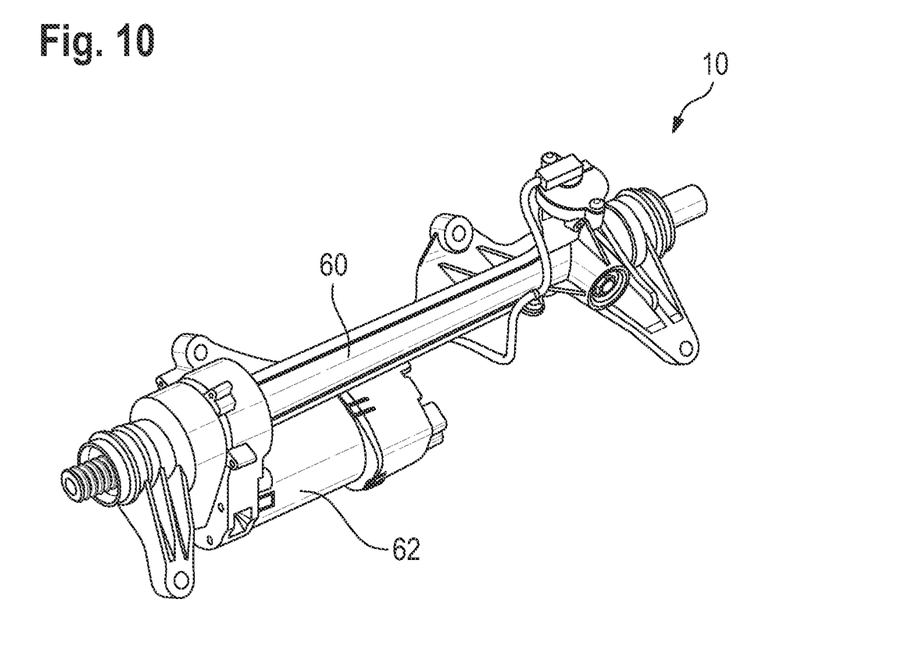
FIG. 10 shows a steering system in accordance with a further embodiment according to the invention in a perspective view.

FIG. 10 shows a steering system 10 in accordance with a further embodiment.

Figure 11:
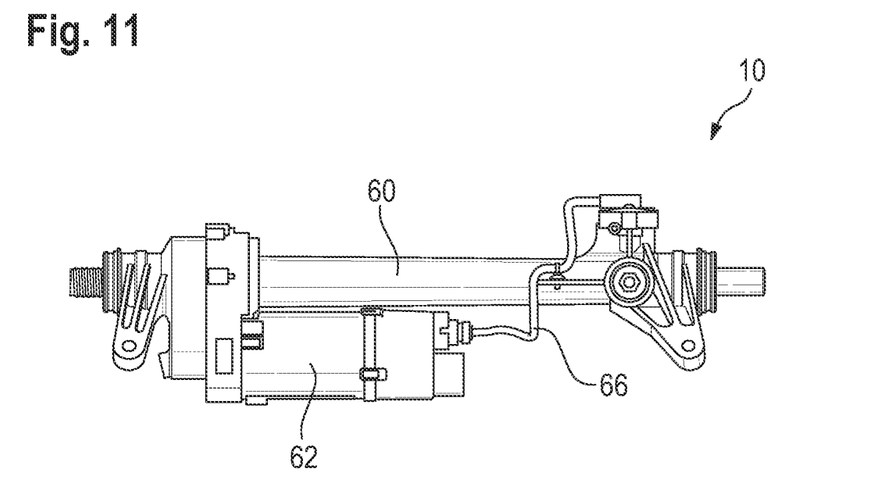
FIG. 11 shows the steering system from FIG. 10 in a longitudinal view.
Figure 12:
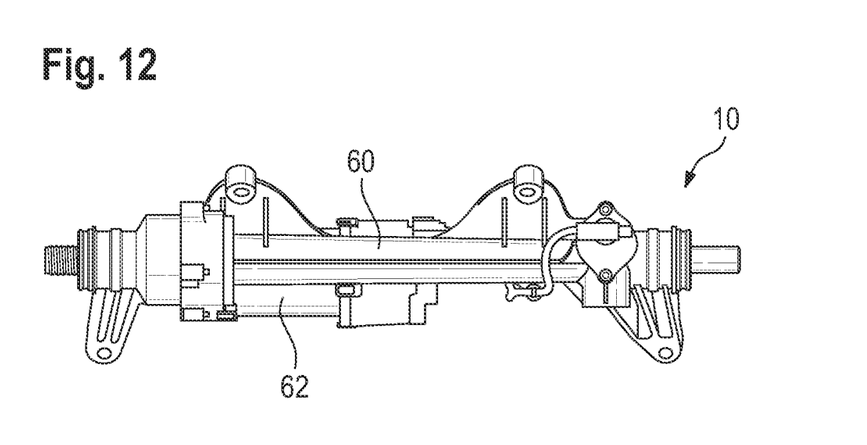
FIG. 12 shows the steering system from FIG. 10 in a plan view.
Figure 13:
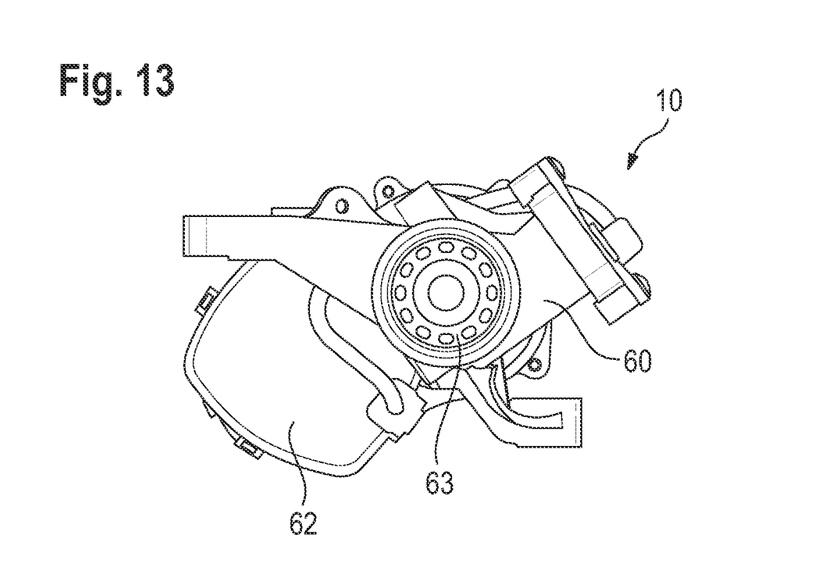
FIG. 13 shows the steering system from FIG. 10 in a side view.

FIGS. 11 to 13 show the steering system 10 from FIG. 10 in various views, in particular in a longitudinal view, a plan view and a side view. The connection of the sensor 34 to the control unit 38 which cannot be seen in FIG. 11 can be seen clearly on the basis of a line 66 in FIG. 11.

The steering system 10 which is illustrated in FIGS. 10 to 13 or in accordance with the further embodiment differs from that embodiment of the steering system 10 which is illustrated in FIGS. 4 to 9 by way of its installation space requirement. This is due to the use of different components.

In particular, the housing 60 of the steering system according to FIGS. 10 to 13 is smaller than the housing 60 of the steering system 10 according to FIGS. 4 to 9, above all in the region of the supporting element 20.

Figure 14:
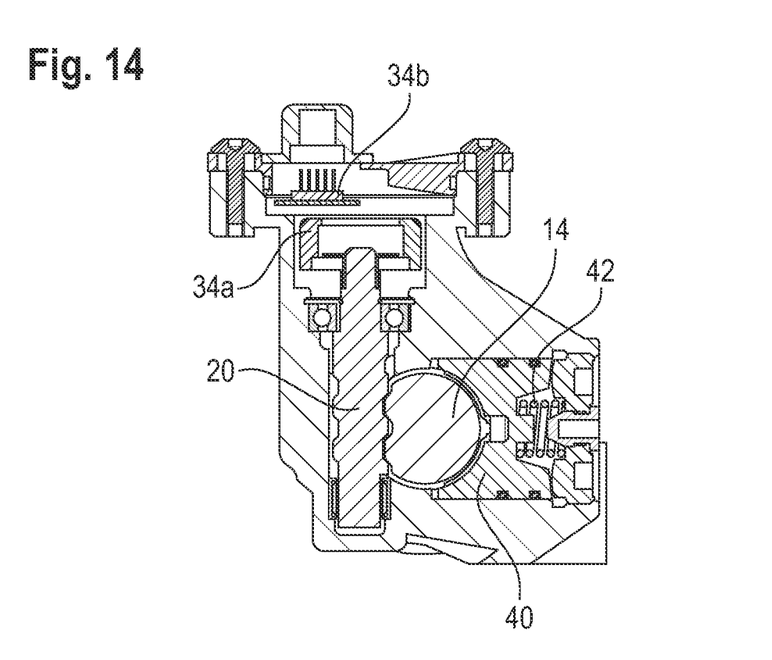
FIG. 14 shows a cross-section through the steering system from FIGS. 10 to 13 in the region of the supporting element.

FIG. 14 shows a cross section through the steering system 10 from FIG. 10 in the region of the supporting element 20.

As can be seen in the cross section, a pressure piece 40 is provided instead of the bearing bush 64 in the case of the steering system 10.

Figure 15:
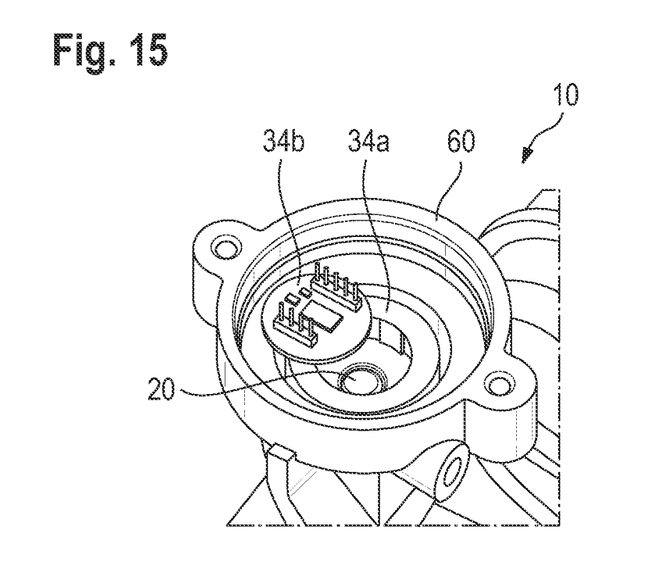
FIG. 15 shows a detailed view of a sensor of the steering system according to FIGS. 10 to 14.

In addition, it can be seen in FIG. 14 that the sensor 34 differs from the sensor 34 which is shown in FIG. 5. This is also apparent from FIG. 15 which shows a detailed view of the sensor 34 in the housing 60.

The sensor wheel 34a is of considerably smaller configuration than the sensor wheel 34a which is shown in FIG. 5. In addition, in the case of the embodiment which is shown in FIG. 14, the sensor wheel 34a is not connected via a spacer sleeve 58 to the supporting element 20, but rather is fastened directly to the supporting element 20.

The pickup 34b is not arranged to the side of the sensor wheel 34a, as can be seen in FIGS. 5 and 9, but rather is arranged above the sensor wheel 34a.

Figure 16:
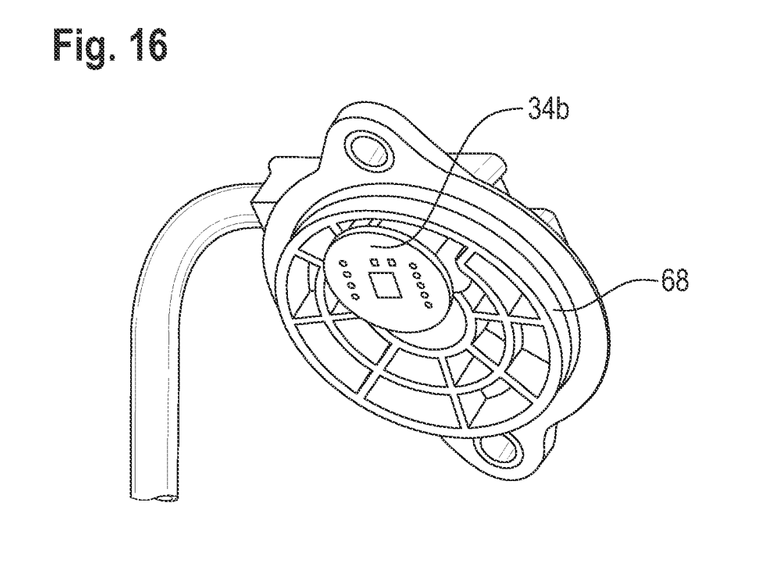
FIG. 16 shows a cover for the housing of the supporting element with a part of the sensor.

In particular, the pickup 34b is fastened to a cover 68 which serves to close the housing 60 after the assembly of the supporting element 20. This is shown in FIG. 16. The cover 68 is preferably made from plastic. In the following text, the method of operation of the steering system 10 will be described in greater detail, which method of operation applies to all the above-described embodiments.

When a driver turns the steering wheel 12, for example starting from the position which is shown in FIG. 1, a corresponding signal is sent to the control unit 38.

Thereupon, the control unit 38 actuates the electric drive 16, as a result of which the belt drive 18 rotates the nut 32 of the recirculating ball mechanism 30. A displacement of the rack 14 in the longitudinal direction of the rack 14 takes place as a result of the rotation. In particular, the recirculating ball mechanism 30 converts a drive torque into a linear drive force.

In the case of the rack 14 being driven by way of the electric drive 16, however, the rack 14 is not only loaded with a force in a displacement direction, but rather also with a torque.

A rotation of the rack 14 is undesired, however. On account of the toothed engagement of the supporting element 20 with the rack 14, however, the supporting element 20 can block a rotation of the rack 14.

The supporting element 20 is therefore given two functions, since it serves for the (indirect) determination of the position of the rack 14 and for the blocking of a rotation of the rack 14.

At the same time, a translational or linear displacement of the rack 14 by way of the supporting element 20 is not impeded, since the supporting element 20 rotates in the case of a displacement of the rack 14, and therefore does not bring about a force on the rack 14 in the displacement direction.

Furthermore, the displacement or the relative position of the rack 14 is detected by means of the sensor 34 and the evaluation unit 36 on the basis of the rotation of the supporting element 20. A rotation of the supporting element 20 by a defined angle corresponds here to a defined longitudinal displacement of the rack 14.

When a position of the rack 14 which corresponds to the steering request of the driver or a position of the steering wheel 12 is reached, a corresponding signal to the control unit 38 to stop the electric drive 16 is brought about. Thereupon, no further displacement of the rack 14 takes place.

LIST OF DESIGNATIONS

10 Steering system
12 Steering wheel
14 Rack
16 Electric drive
17 Electric motor
18 Belt drive
20 Supporting element
22 First end
24 Second end
26 Toothing system
28 Thread
30 Recirculating ball mechanism
32 Nut
34 Sensor
34a Sensor wheel
34b Pickup
36 Evaluation unit
38 Control unit
40 Pressure piece
42 Spring element
44 Contact face
46 Bearing bush
48 Bearing
50 Bearing
52 Step
54 Securing ring
56 Securing ring
58 Spacer sleeve
60 Housing
62 Housing
63 Damping unit
64 Bearing bush
66 Line
68 Cover

The invention claimed is:

1. A steering system (10) for a motor vehicle, which steering system (10) is configured as a steer-by-wire steering system, the steering system (10) comprising a rack (14), an electric drive (16) for the longitudinal displacement of the rack (14), and a rotatably mounted supporting element (20) which is spaced apart from the electric drive (16) along the longitudinal axis of the rack (14), and the rotatably mounted supporting element (20) being in toothed engagement with the rack (14) and rotating only in response to the longitudinal displacement of the rack (14).

2. The steering system (10) as claimed in claim 1, wherein the supporting element (20) is inclined relative to an axis which is perpendicular with respect to the displacement direction of the rack (14).

3. The steering system (10) as claimed in claim 1, wherein a sensor (34) is provided which, together with an evaluation unit (36), is configured to determine the position of the rack (14).

4. The steering system (10) as claimed in claim 3, wherein the sensor (34) is connected fixedly to the supporting element (20), the sensor (34) being attached via the supporting element (20) to the rack (14).

5. The steering system (10) as claimed in claim 3, wherein the sensor (34) is connected in a signal-transmitting manner to a control unit (38) which actuates the electric drive (16).

6. The steering system (10) as claimed in claim 1, wherein the electric drive (16) comprises a belt drive (18).

7. The steering system (10) as claimed in claim 1, wherein a recirculating ball mechanism (30) is provided which interacts with the electric drive (16), the recirculating ball mechanism (30) being connected to a belt drive (18), in particular.

8. The steering system (10) as claimed in claim 1, wherein the steering system (10) comprises a bearing bush (46, 64) of separate configuration which supports the rack (14) on the circumferential side.

9. The steering system (10) as claimed in claim 1, wherein the steering system (10) comprises two bearing bushes (46, 64) which are spaced apart from one another in the longitudinal direction of the rack (14), the bearing bushes (46, 64) together forming a rack guide.

10. The steering system (10) as claimed in claim 1, wherein the steering system (10) comprises a pressure piece (40) which is arranged in the region of the supporting element (20) and which supports the rack (14).

11. The steering system (10) as claimed in claim 1, wherein the rotatably mounted supporting element (20) is assigned to a first end (22) of the rack (14), the electric drive (16) being assigned to a second end (24) of the rack (14), which second end (24) lies opposite the first end (22).

12. The steering system (10) as claimed in claim 1, wherein the rotatably mounted supporting element (20) is free of mechanical connections to a steering wheel (12).

13. The steering system (10) as claimed in claim 1, further comprising a pressure piece (40) that maintains the toothed engagement between the supporting element (20) and the rack (14).

14. The steering system (10) as claimed in claim 1, further comprising a bearing bush (64) that maintains the toothed engagement between the supporting element (20) and the rack (14).

* * * * *